Jan. 31, 1933. H. A. LEWIS 1,895,517
MANUFACTURE OF POLYHYDRIC ALCOHOLS
Filed July 21, 1926
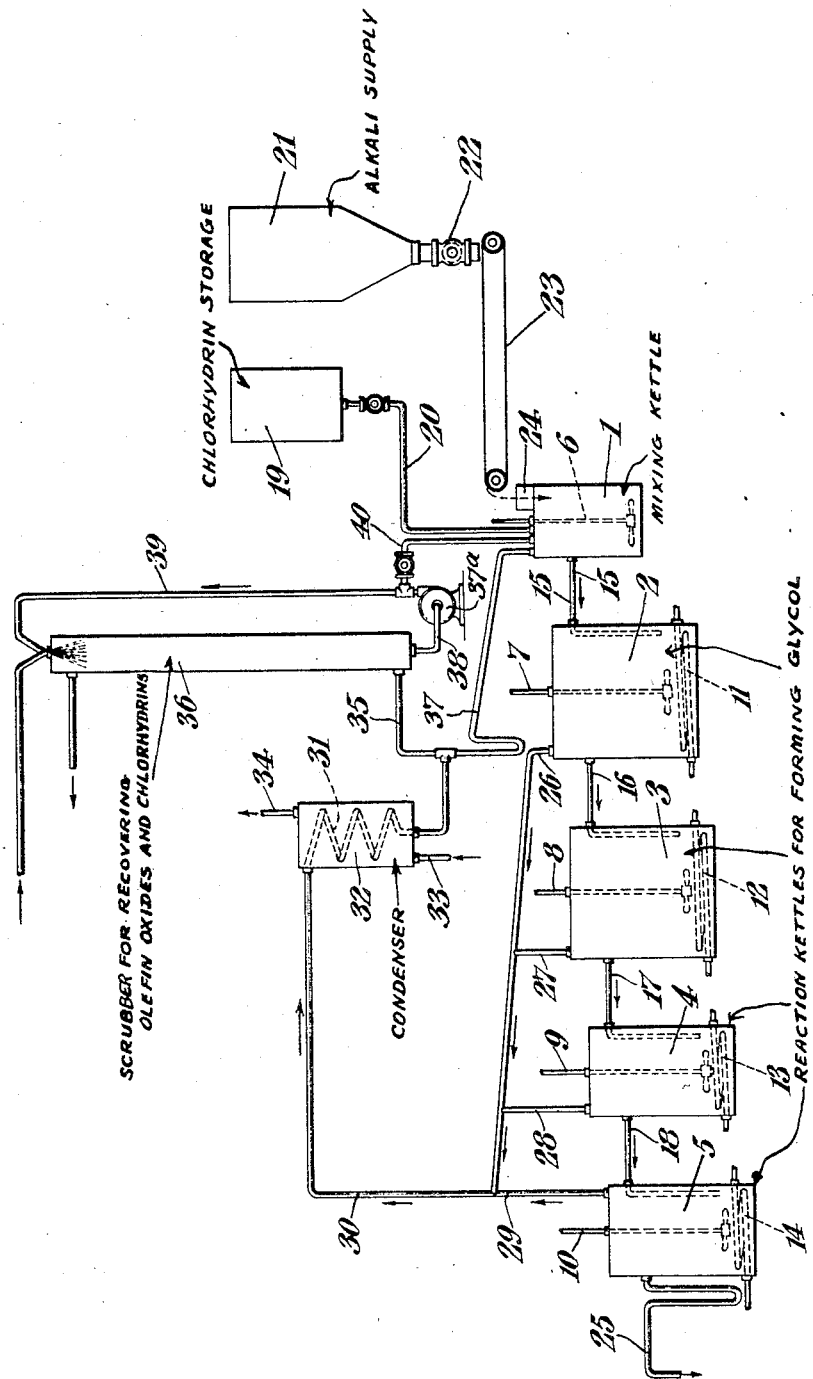

UNITED STATES PATENT OFFICE

HAROLD A. LEWIS, OF WOODBURY, NEW JERSEY, ASSIGNOR TO E. I. DU PONT DE NEMOURS & COMPANY, OF WILMINGTON, DELAWARE, A CORPORATION OF DELAWARE

MANUFACTURE OF POLYHYDRIC ALCOHOLS

Application filed July 21, 1926. Serial No. 123,914.

My invention relates especially to a process designed for the production of polyhydric alcohols from chlorhydrins but it has relation more particularly to the manufacture of glycols.

The object of my invention is to provide a process by means of which the polyhydric alcohols, and especially glycols, may be made from the corresponding chlorhydrins. A further object is to provide a process of this character which is continuous in operation.

The production of polyhydric alcohols by the hydrolysis of chlorhydrins with alkalies has been previously known, the reactions for the hydrolysis of the olefin chlorhydrins to the glycols being the following:

(1) $C_nH_{2n}OHCl + NaOH =$
$$C_nH_{2n}(OH)_2 + NaCl$$
(2) $2C_nH_{2n}OHCl + Na_2CO_3 + H_2O =$
$$2C_nH_{2n}(OH)_2 + 2NaCl + CO_2$$
(3) $C_nH_{2n}OHCl + NaHCO_3 =$
$$C_nH_{2n}(OH)_2 + NaCl + CO_2$$

The use of these hydrolyzing agents under ordinary conditions has resulted, however, in the formation of the olefin oxides which are either gases or low boiling liquids, and easily escape during the reaction. These oxides are formed according to the following equation:

(4) $2C_nH_{2n}OHCl + Na_2CO_3 =$
$$2C_nH_{2n}O + 2NaCl + CO_2 + H_2O$$

Attempts have been made to carry out these reactions at pressures above the atmospheric pressure, to obviate the loss of the olefin oxides and to form the glycols from the said oxides by hydration as follows:

(5) $C_nH_{2n}O + H_2O = C_nH_{2n}(OH)_2$

However, this results in polymerizing the oxides and in forming addition products of the oxides with the glycols which would not then be recoverable as the glycols. Low yields, low efficiency, and high cost have consequently resulted. Inasmuch, also, as the previous processes were carried out merely by the batch method, a very high cost of operation resulted.

It is the object of my invention to avoid the above difficulties and disadvantages. In general, I proceed by carrying out the hydrolysis in a series of steps at progressively increasing temperatures during suitable time intervals and with the proper concentrations of the solutions under atmospheric pressures, and recover the by-products, as well as any chlorhydrin which might otherwise escape, and return the same to the process for further treatment. Furthermore, I preferably carry out the process continuously, thereby securing a much higher efficiency in operation. By this means very high yields are obtained and, in fact, the yield of glycol may be made to approach the theoretical maximum without requiring the use of costly apparatus, etc. I have found in practice that it is best, furthermore, to carry out the process by using relatively low temperatures when the concentration of chlorhydrin in solution is relatively high, and higher temperatures when the concentration has been decreased.

While my invention is capable of being carried out in many different ways, for the purpose of illustration I shall describe only certain ways of carrying out the same hereinafter, and while it is capable of being carried out in many different types of apparatus, I have shown only one type of apparatus in the accompanying drawing, in which—

The figure is a diagrammatic representation of an apparatus for use in accordance with my invention.

For example, in carrying out my invention I may provide an apparatus as shown in the drawing, comprising a series of reaction kettles 1, 2, 3, 4 and 5, which are provided respectively with agitators 6, 7, 8, 9 and 10, the kettles 2, 3, 4 and 5 being provided respectively, also, with heating coils 11, 12, 13 and 14. It will be noted, furthermore, that the kettles 1, 2, 3, 4 and 5 are connected each to the succeeding kettle by means of pipes 15, 16, 17 and 18, which have their outlets near the bottom of the respective kettles, the kettles being, furthermore, located at progressively decreasing levels in order to provide for the flow of the liquid through the series of kettles without the aid of pumps. Also, it will be noted that the kettle 1 is small and is not provided with a heating means as it is used primarily for the mixing of the materials, while kettles 2 and 3 are large, to provide a comparatively long time interval for the reaction owing to the low temperatures therein. For similar reasons the kettles 2 and 3 are larger than kettles 4 and 5 inasmuch as the rate of chlorhydrin hydrolyzed to glycol increases with the temperature applied. The chlorhydrin is continuously supplied from a storage tank 19 by means of a valve lead 20, to the kettle 1, the same being adapted to supply the chlorhydrin to the said kettle 1 at the rate of 10 liters per hour, of a solution in water containing approximately 20% of chlorhydrin. Also, alkali, as, for example soda ash, but which may be any of the hydrates or carbonates or bicarbonates of the alkali metals, either in the pure or commercial form, is continuously supplied from a hopper 21 through a measuring valve 22 at the rate of 8.2 kilograms per hour to a constantly moving conveyor 23 which discharges the same through an opening 24 into the kettle 1. The combined feed of chlorhydrin and alkali is fixed with regard to the other conditions of operation, so that only a small amount of unchanged chlorhydrin passes into the kettle 5. From the kettle 1, which is maintained at ordinary room temperatures, or at such a temperature as to avoid a reaction producing any substantial amount of carbon dioxide or loss of chlorhydrin by vaporization, the mixed materials pass into the kettle 2, which is maintained at a temperature of from 140 to 160° F., it being understood that the agitators in these two kettles 1 and 2, as well as the remaining kettles, are constantly in operation to stir the contents of the same. Thence the reacting materials pass into the kettle 3, which is maintained at a temperature of about 170° to 180° F., thence into the kettle 4, which is maintained at a temperature of from 200 to 210° F., and finally into the kettle 5, which is maintained at the boiling point, the glycol solution being drawn off from the kettle 5 by means of a trapped pipe 25. During the reaction which takes place in the kettles 2, 3, 4 and 5 the gases which are evolved therefrom, as set forth in the Equations (2) and (4), comprising carbon dioxide containing olefin oxides and some chlorhydrin, pass out of the same, the remaining chlorhydrin having been boiled out of the kettle 5, by means of leads 26, 27, 28 and 29, to a lead 30 which conducts the same to a condensing coil 31 in a concurrent of water supplied with the aid of inlet and outlet pipes 33 and 34. As a result the most of the olefin oxides and chlorhydrin are condensed and pass into a separator comprising a pipe 35 for separating out and conveying the carbon dioxide with small amounts of olefin oxides and chlorhydrin to a scrubbing tower 36 while the liquid olefin oxides and chlorhydrin are returned by a trapped pipe 37 to the mixing kettle 1. The olefin oxides and chlorhydrin which are conveyed to the tower 36 by the pipe 35, are scrubbed out of the carbon dioxide therein by means of water or a glycol solution of any convenient strength, which is circulated in said tower by means of a pump 37a having pipes 38 and 39 connected to the bottom and top of the tower 36 respectively, a valved draw-off pipe 40 being provided to connect the pipe 39 with the mixing kettle 1 so as to draw off the circulating liquid from time to time when desired, so as to treat the same with the other reacting materials in the process for the recovery of the liquids by the circulation of the same in the tower 36. It will be understood that the circulating liquid may be drawn off from the tower 36 either in whole or in part, and from time to time, or continuously, as desired. In this manner the vaporized chlorhydrin is prevented from escaping and is returned to the process to form glycol and the olefin oxides become hydrolyzed according to the reaction (5) to form glycol. It will, of course, be understood that any of the chlorhydrin and olefin oxides, to be further treated in this way, may be returned to any desired point in the course of the flow of the reacting material.

In carrying out the process, further, it is to be understood that any suitable olefin chlorhydrin or mixture of the same may be used for producing the desired corresponding glycol or mixture of glycols. Also, any other polyhydric alcohol may be produced in this manner, as, for example, in the production of glycerol by the hydrolysis of glycerol monochlor- and dichlorhydrins, any desired strength of the chlorhydrin solutions being chosen. Also, the time intervals of the reactions may be varied, and the number of steps may be increased or decreased, as desired. By maintaining the kettle 5 at a boiling temperature, which is generally preferable in carrying out the process, all the chlorhydrin and olefin oxides are removed from the glycol solution and as a consequence the amount of alkali used may be maintained at a minimum. Furthermore, instead of the recovery of these gaseous materials by means of the tower 36, any other mode of recovery found desirable may be used. Also, the sizes and forms of the parts of the apparatus may be varied within wide limits to suit the particular conditions of operation. The scrubbing tower 36 may be constructed, in any suitable way, for the use of a spray or otherwise, and in accordance with any of the known methods of operation of scrubbing towers.

While I have described my invention above in detail I wish it to be understood that many other changes may be made therein without departing from the spirit of the same.

I claim:

1. The process which comprises making a polyhydric alcohol by hydrolyzing a chlorhydrin in a series of steps at progressively increasing temperatures.

2. The process which comprises continuously making a polyhydric alcohol by continuously hydrolyzing a chlorhydrin in a series of steps at progressively increasing temperatures at atmospheric pressures and withdrawing the alcohol formed.

3. The process which comprises continuously making glycol by continuously hydrolyzing an olefin chlorhydrin in a series of steps at progressively increasing temperatures at atmospheric pressures and withdrawing the alcohol formed.

4. The process which comprises continuously making a polyhydric alcohol by continuously hydrolyzing a chlorhydrin at atmospheric pressures in a series of steps at progressively increasing temperatures, the last step being at a boiling temperature, and withdrawing the alcohol formed.

5. The process which comprises continuously making glycol by continuously hydrolyzing an olefin chlorhydrin at atmospheric pressures in a series of steps at progressively increasing temperatures, the last step being at a boiling temperature, and withdrawing the glycol formed.

6. The process which comprises continuously making a polyhydric alcohol by continuously hydrolyzing a chlorhydrin at atmospheric pressures in a series of five steps at progressively increasing temperatures, the said steps being at approximately the room temperature, from 140 to 160° F., from 170 to 180° F., from 200 to 210° F., and at a boiling temperature, and withdrawing the alcohol formed.

7. The process which comprises continuously making glycol by continuously hydrolyzing an olefin chlorhydrin at atmospheric pressures in a series of five steps at progressively increasing temperatures, the said steps being at approximately the room temperature, from 140 to 160° F., from 170 to 180° F., from 200 to 210° F., and at a boiling temperature, and withdrawing the gylcol formed.

8. The process which comprises continuously making polyhydric alcohol by continuously hydrolyzing a chlorhydrin in a series of steps at progressively increasing temperatures with a solid alkali metal carbonate at atmospheric pressures, and withdrawing the alcohol formed.

9. The process which comprises continuously making glycol by continuously hydrolyzing an olefin chlorhydrin in a series of steps at progressively increasing temperatures with a solid alkali metal carbonate at atmospheric pressures, and withdrawing the glycol formed.

10. The process which comprises continuously making a polyhydric alcohol by continuously hydrolyzing a chlorhydrin in a series of steps at progressively increasing temperatures at atmospheric pressures, recovering the evolved vapors of chlorhydrin and olefin oxides and returning them to the reaction mixture after having separated therefrom the carbon dioxide by scrubbing, and withdrawing the alcohol formed.

11. The process which comprises continuously making glycol by continuously hydrolyzing an olefin chlorhydrin in a series of steps at progressively increasing temperatures at atmospheric pressures, recovering the evolved vapors of chlorhydrin and olefin oxides and returning them to the reaction mixture after having separated therefrom the carbon dioxide by scrubbing, and withdrawing the glycol formed.

12. The process which comprises making glycol by hydrolyzing an olefin chlorhydrin in a series of steps at progressively increasing temperatures at atmospheric pressures, recovering the evolved vapors of chlorhydrin and olefin oxides and returning them to the reaction mixture after having separated therefrom the carbon dioxide by scrubbing, and withdrawing the glycol formed.

13. The process which comprises continuously making a polyhydric alcohol by continuously hydrolyzing a chlorhydrin at atmospheric pressures, recovering the evolved vapors of chlorhydrin and olefin oxides, and returning them to the reaction mixture after having separated therefrom the carbon dioxide by scrubbing, the process being carried out in a series of steps and the vapors being recovered and returned from a plurality of said steps to one of the series of steps, and withdrawing the alcohol formed.

14. The process which comprises continuously making glycol by continuously hydrolyzing an olefin chlorhydrin in a series of steps at progressively increasing temperatures at atmospheric pressures, recovering the evolved vapors of chlorhydrin and olefin oxides and returning them to the reaction mixture after having separated therefrom the carbon dioxide by scrubbing, the process being carried out in a series of steps and the vapors being recovered and returned from a plurality of said steps to one of the series of steps, and withdrawing the glycol formed.

15. The process which comprises making a polyhydric alcohol by hydrolyzing a chlorhydrin in a series of steps at progressively increasing temperatures at atmospheric pressures, recovering the evolved vapors of chlorhydrin and olefin oxides and returning them to the reaction mixture after having separated therefrom the carbon dioxide by scrubbing, the process being carried out in a series of steps and the vapors being recovered and returned from a plurality of said steps to one of the series of steps, and withdrawing the alcohol formed.

16. The process which comprises making glycol by hydrolyzing an olefin chlorhydrin in a series of steps at progressively increasing temperatures at atmospheric pressures, recovering the evolved vapors of chlorhydrin and olefin oxides and returning them to the reaction mixture after having separated therefrom the carbon dioxide by scrubbing, the process being carried out in a series of steps and the vapors being recovered and returned from a plurality of said steps to one of the series of steps, and withdrawing the glycol formed.

In testimony that I claim the foregoing, I have hereunto set my hand this 13th day of July, 1926.

HAROLD A. LEWIS.